Oct. 27, 1964 E. G. SIMS ETAL 3,154,456
CAUSTIC RECOVERY UNIT WITH SPECIFIC GRAVITY FLOW CONTROL MEANS
Filed Dec. 22, 1960 3 Sheets-Sheet 1

INVENTORS
EVERETT G. SIMS
HOWARD M. DUVALL, JR.
BY
Charles L. Lovercheck
attorney INVENTORS
HOWARD M. DUVALL, Jr.
EVERETT G. SIMS
BY
Charles L. Lovercheck
attorney Oct. 27, 1964 E. G. SIMS ETAL 3,154,456
CAUSTIC RECOVERY UNIT WITH SPECIFIC GRAVITY FLOW CONTROL MEANS
Filed Dec. 22, 1960 3 Sheets-Sheet 3

INVENTORS.
HOWARD M. DUVALL, Jr.
EVERETT G. SIMS
BY
Charles L. Lovercheck
Attorney

United States Patent Office 3,154,456
Patented Oct. 27, 1964

3,154,456
CAUSTIC RECOVERY UNIT WITH SPECIFIC
GRAVITY FLOW CONTROL MEANS
Everett G. Sims, 342 W. 40th St., Erie, Pa., and Howard
M. Duvall, Jr., 2237 Roswell Ave., Charlotte, N.C.
Filed Dec. 22, 1960, Ser. No. 77,686
8 Claims. (Cl. 159—20)

This invention relates to a caustic recovery system and, more particularly, to an improved process and mechanism for the reconcentration of diluted solution of brine or a solution of sodium hydroxide.

In processes such as "mercerizing" using solutions of NaOH wherein solutions such as sodium hydroxide are used, the solutions sometimes become sufficiently diluted in carrying out the process that they cannot be properly used further in that diluted condition.

Various machines and processes have been proposed for reconcentrating such diluted solutions. Basically, all of these prior systems utilized heat to vaporize the diluting solution and to reconcentrate the liquid, sometimes in two stages. Heat used in the process was wasted. In reconcentrating solutions in certain previous mechanisms, the temperature of the solution had to be kept up above the flash point of the solution.

In the present invention disclosed herein, the solution is kept under pressure to prevent evaporation and, also, to prevent the solution from flashing to vapor. The present invention proposes a recirculation of the solution wherein the solution does not contaminate the heater and, as a result of the construction of the apparatus, the apparatus can be made and housed in a smaller unit. Further, the apparatus disclosed herein provides a system which will utilize less cold water for intermediate cooling and the heated water by-product of the process may be used in other manufacturing processes, thus saving the heat therein.

It is, accordingly, an object of the present invention to provide an improved apparatus and process for concentrating sodium hydroxide solutions.

Another object of the invention is to provide an improved process and apparatus for concentrating salt solutions.

Still another object of the invention is to provide an improved apparatus for concentrating sodium hydroxide solutions wherein a minimum amount of water is used in the process and this water is heated and can subsequently be utilized for other manufacturing processes.

A further object of the invention is to provide an improved apparatus for concentrating sodium hydroxide solutions which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
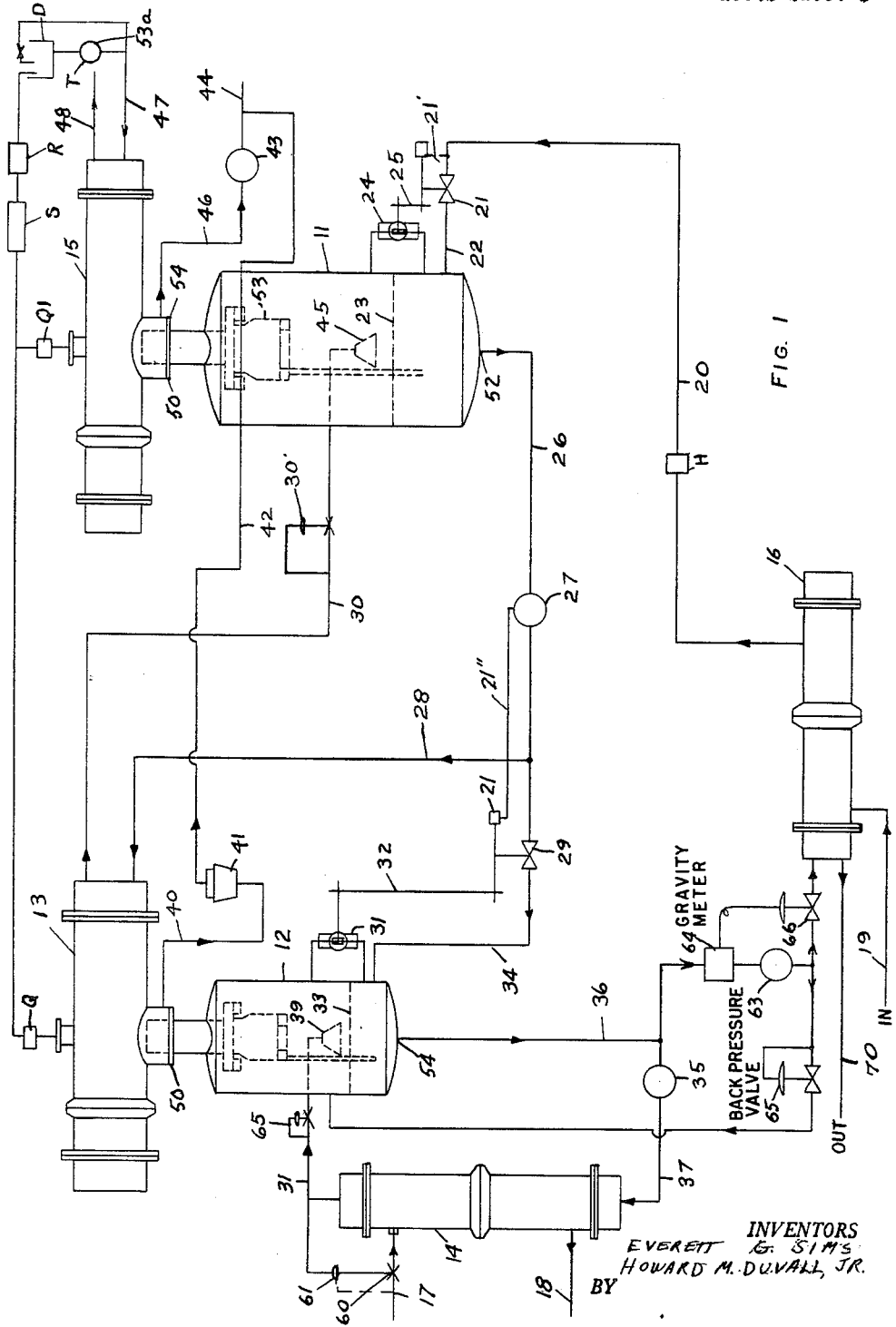
FIG. 1 is a diagram of the apparatus according to the invention.

Now with more particular reference to the drawings, the apparatus shown is made up of a first effect tank 11, a second effect tank 12, a second effect condenser 13, a heater 14, a first effect condenser 15, and an after cooler 16 connected together as shown. Steam is fed in through a pipe 17 to the heater 14 and condensate is drained therefrom through a line 18. The heater and condensers shown are intended to be heat exchangers which may be of the shell and tube type familiar to those skilled in the art. The heater 14 is the only prime heat source used.

A caustic solution which may be diluted to, for example, six percent, is brought in through a caustic inlet pipe 19 and flows through the after cooler 16 and out a pipe 20 through a level control valve 21 to the first effect tank 11 by way of a pipe 22. The liquid level indicated at 23 in the tank 11 is controlled by a differential control mechanism 24 which acts through a linkage 25 to turn on and off or modulate the valve 21 in order to maintain the level of liquid 23 between predetermined limits.

The liquid from the tank 11 is pumped through a pipe 26 by a pump 27 which may be, for example, a pump having an output of approximately one thousand four hundred eighty-five gallons per minute. The pump 27 pumps the solution either through a pipe 28 when a valve 29 is closed and through the first effect condenser 13 and then through a pipe 30 back to the first effect tank 11. The valve 21 has a control switch mechanism 21' thereon which may automatically start the pump 27 when the liquid level 23 rises to a predetermined point through a line 21".

The valve 29 is opened and closed by a differential valve 31 which acts through a linkage 32 to open or close the valve 29 to maintain a level of liquid at 33 in the tank 12 between predetermined limits. That is, when the liquid level 33 is lower than a predetermined amount, the differential control valve 31 will exert a force through the linkage 32 and swing the actuating mechanism on the valve 29 in a direction to close the switch mechanism 21' and cause the pump 27 to pump liquid through a pipe 34 into the tank 12.

When the liquid level 33 is above a predetermined limit, the valve 29 will close and cause the pump 27 to force liquid through the pipe 28, the second effect condenser 13, the pipe 30, and a back pressure valve 30' and to a spray head 45. At this point, part of the water from the solution is flashed into steam which passes through a centrifix and into the first effect condenser 15 where it condenses. The heat therefrom heats water flowing through the condenser from a pipe 47 to a pipe 48 which may be used for other manufacturing processes. The low absolute pressure in the condensers 15 and 13 is caused by a jet ejector 5 which could be a vacuum pump.

The temperature of the caustic solution fed to the heater 14 is controlled by the temperature responsive control valve 60 which is controlled by a thermal responsive valve 61 which opens to allow more steam flow through the pipe 17 when the temperature of the solution flowing in a pipe 38 drops below a predetermined value. The valve 60 automatically moves toward open position as the temperature of the liquid flowing in the pipe 38 drops below a predetermined temperature. Thus, the valve 60 limits the amount of steam fed to the heater 14.

A pump 35 may have a capacity of, for example, three hundred fifty-one gallons per minute and it circulates brine from the tank 12 through a pipe 36, to the heater 14 by way of a pipe 37, and thence back to the tank 12 by way of the pipe 38. The brine from the pipe 38 enters the tank 12 by way of a nozzle 39 and as it is discharged, the pressure thereof drops considerably and the liquid therefrom will therefore flash into steam. The steam will pass through the second effect condenser 13 and the condensate therefrom will flow through a pipe 40 and be pumped by a pump 41 to a pipe 44.

A pump 63 pumps a solution of fifty percent caustic through a specific gravity meter 64 and a back pressure valve 65 to the tank 12. The pump 63 continues to pump approximately fifty percent caustic solution into the tank 12 until such time as the strength of the liquid in the tank 12 increases to a predetermined percentage of concentration, for example, fifty percent.

When the concentration of the caustic solution in the tank 12 reaches the predetermined value, the specific gravity meter 64 modulates open a discharge valve 66 and allows the fifty percent solution to flow to the after cooler 16 and be discharged to a storage tank for future use. The discharge may be at the rate of five gallons per minute, for example.

Absolute pressure controllers Q and Q1 which may be vacuum pumps control the absolute pressure in the condensers 13 and 15 and maintain a vacuum thereon. A meter R sets off an alarm in the event that the pH of the water rises above a predetermined value. A de-aeration tank D collects discharge from the meter R and a pump 53a returns the de-aerated liquid to the condenser 15. Condensate from the pipe 44 may be used for other manufacturing processes.

The only heat supplied to the device is through the heater 14. The incoming liquid from the pipe 19 is heated by the concentrated solution in the after cooler 16. The heat from the system carried by water from the pipe 48 may be used in other manufacturing processes.

Figure 3:
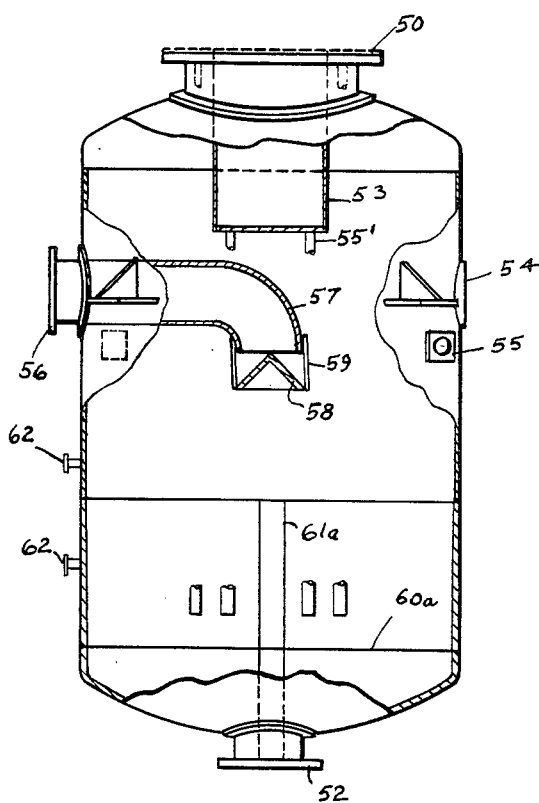
FIG. 3 is a broken away view of a tank used in the diagram.

The details of the first tanks are shown in FIG. 3. The tank shown is made in the form of a pressure vessel which could be, for example, of an overall height of ten feet by six feet in diameter. The condenser is connected to the flanged opening having a flange 50 with spaced peripheral bolt holes 51 therein. The bottom has an opening with a flange 52 surrounding it for connecting it in the case of the tank 11 to the pipe 26 and, in the case of the tank 12, to the pipe 36.

A centrifix is made up of a tubular member 53 which is welded at its upper end to the inside of the flange 50 and its open end extends downwardly approximately one-fifth of the distance down into the tank. A tube 55' is connected through the bottom of the tubular member 53. An annular condensate pump surrounds the central tubular member 53 to collect condensate. A manhole 54 is provided in the side of the tank for inspection and repair and a sight glass 55 is also provided for inspection of the interior of the tank.

A line 57 is connected to a flanged pipe 56 which extends through one side of the tank and terminates at its inward end in a downwardly facing elbow which has a conical shaped baffle 58 supported in spaced relation thereto by means of angles 59. The baffle 58 forms a diverting or nozzle member for the liquid entering the tank.

Plate like anti-swirl baffles 60a are supported in the bottom of the tank in cruciform relation. They are welded at their inner ends to a pipe 61a and at their outer ends to the inner periphery of the tank. The baffles 60a prevent the liquid and gases from swirling inside the tank. Nozzle openings 62 are provided at the lower half of one side of the tank.

Figure 2:
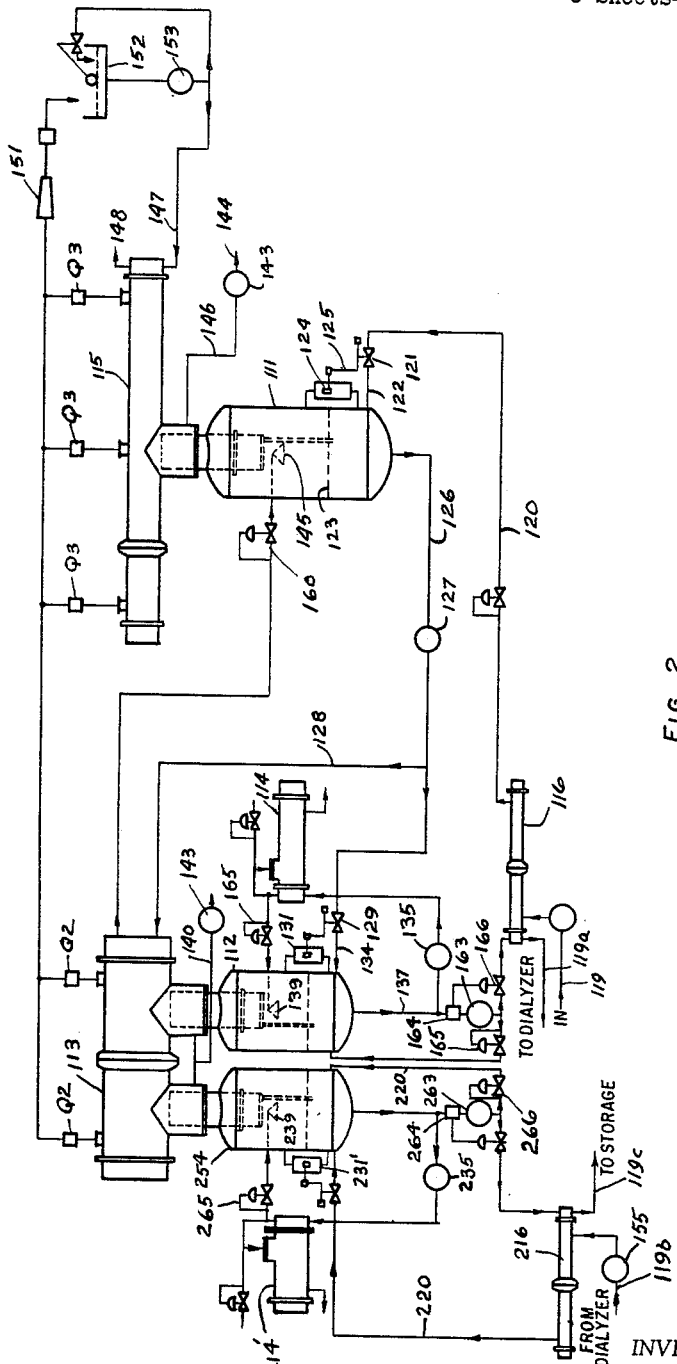
FIG. 2 is a diagram of another embodiment of the invention.
Figure 4:
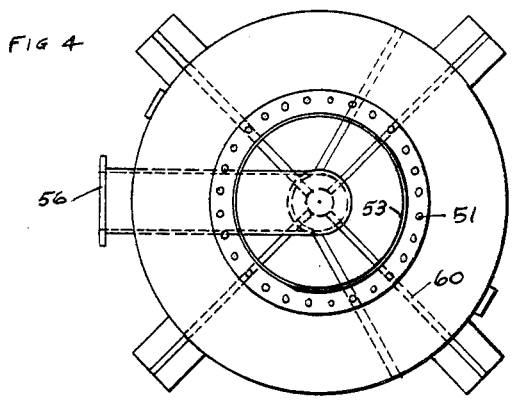
FIG. 4 is a bottom view of the tank.

The circuit disclosed in FIG 2 shows a caustic recovery unit similar to that shown in FIG. 1 for use with a dialyzer. A tank 254 similar to the second effect tank in FIG. 1 is shown. Connected to the tank 254 is an after cooler 116 and the other equipment similar to that shown in FIG. 1. Index numerals are used in FIG. 2 corresponding to those used for corresponding parts in FIG. 1 but having one hundred added to the numerals.

Dilute caustic solution is received through a pipe 119 and it passes through the system as in FIG. 1. The concentrated liquid from a line 119a flows to the dialyzer and from the dialyzer to a line 119b to the after cooler 116. The concentrated liquid returns through the line 119c to the storage tank.

The tank 254 operates identical to the tank 112 except that the liquid from the dialyzer has been diluted therein to approximately ten percent to twelve percent NaOH. A specific gravity valve 264 may discharge this liquid at approximately fifty percent NaOH.

Dilute caustic solution is fed to the pipe 119 and it passes through the first system made up of tanks 111 and 112 as such liquid passes through the corresponding tanks in the embodiment shown in FIG. 1 and is concentrated. Concentrated caustic solution which returns to the line 119a passes through a dialyzer. The dialyzer may be of a standard type with which persons skilled in the art are familiar and for the purpose of treatment of the solution. The dialyzer may dilute the liquid coming from the pipe 119 to approximately ten percent to twelve percent NaOH.

Caustic solution passes from the dialyzer through a cooler 216 to a valve 231 and thence to the tank 254. The valve 231 insures that the liquid level in the tank 254 will be maintained between predetermined limits.

When the concentration of the liquid in the tank 254 is diluted below a predetermined value which is the value below which the specific gravity valve 264 will remain closed, liquid will be blocked from flowing to the storage tank. Pressure built up by a pump 263 will force back pressure valve 266 to open. This will allow liquid from the pump 263 to recirculate through a heater 214' and the tank 254.

A pump 235 will continuously circulate the caustic liquid through the heater 214' which will be discharged through a nozzle 239 and a condenser 113. The pump 263 will recirculate liquid to the tank 254 as long as the valve 264 is closed. When the concentration of liquid in the tank 254 increases to the value at which the valve 264 will open, it will open and the pressure in the valve 266 will decrease, allowing the valve 266 to close. Liquid will therefore be discharged through a tank 216 to a suitable storage tank provided. The liquid from the tank 216 will be cooled by liquid flowing from the dialyzer through the heater 214' to the tank 254 by way of a pipe 220.

Condensate from a pipe 144 may be used in other manufacturing processes. Cold water entering at a pipe 147 passes through a cooler 115 and is discharged as hot water at 148 which may be used in other manufacturing processes.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A recovery unit for concentrating a solution comprising an after cooler, a first tank, a second tank, a first heater, a second heater, means connecting a diluted solution through said after cooler to said first tank, a valve responsive to the level of liquid in said first tank controlling the flow of liquid thereinto, a concentrate pump pumping liquid selectively through a valve to said second tank when the liquid level therein is below a predetermined value and pumping liquid through said first heater when the liquid in said second tank is above a predetermined value, said liquid flowing from said first heater through a spray means to said first tank, means connecting liquid from said second tank to a specific gravity valve, said specific gravity valve selectively connecting said concentrated liquid to said after cooler and thence to a storage tank when the specific gravity of said concentrated liquid is above a certain value and connecting said liquid from said second tank to flow through said second heater when the specific gravity of said concentrated liquid is below a certain value, external heating means for said second tank, and means in said first tank to remove condensed vapors from said unit.

2. The recovery unit recited in claim 1 wherein a high concentrate pump circulates said liquid from said second tank through said first heater to a spray nozzle in said first tank where it flashes into steam.

3. The recovery unit recited in claim 1 wherein said means to remove condensed vapors comprises a first condenser, said vapors from said condensate pump flowing into said first tank through an expansion device which causes it to flash into steam, some of said steam entering said first condenser being condensed and drawn off, and cooling means for said first condenser.

4. The recovery unit recited in claim 1 wherein a back pressure valve is provided in a line between said first heater and said specific gravity valve.

5. The recovery unit recited in claim 4 wherein a pump is connected between said second tank and said specific gravity valve and a constant pump is connected between said second tank and said second heater.

6. The recovery unit recited in claim 5 wherein said concentrated liquid is recirculated through said second tank, transferring said liquid flowing through said first tank to said heater.

7. The recovery unit recited in claim 1 wherein said external heating means comprises a heat exchanger operated by steam.

8. The recovery unit recited in claim 1 wherein said first heater comprises a condenser connected to said second tank.

References Cited in the file of this patent

UNITED STATES PATENTS

| | | |
|---|---|---|
| 2,193,483 | Hinckley | Mar. 12, 1940 |
| 2,631,926 | Eckstrom | Mar. 17, 1953 |
| 2,698,225 | Svanoe | Dec. 28, 1954 |
| 2,722,541 | Schulz | Nov. 1, 1955 |
| 2,777,514 | Eckstrom | Jan. 15, 1957 |
| 2,800,955 | Honig | July 30, 1957 |